United States Patent [19]

Arov

[11] Patent Number: 4,974,095
[45] Date of Patent: Nov. 27, 1990

[54] METHOD AND APPARATUS FOR DISPLAYING AN IMAGE

[76] Inventor: Anatoly Arov, 4190 Bathurst Street, Suite 503, Downsview, Ontario, Canada, M3H 3P9

[21] Appl. No.: 433,852

[22] Filed: Nov. 9, 1989

Related U.S. Application Data

[63] Continuation-in-part of Ser. No. 667,421, Nov. 1, 1984, abandoned.

[30] Foreign Application Priority Data

Nov. 1, 1983 [CA] Canada ................................ 440186

[51] Int. Cl.$^5$ .............................................. H04N 9/31
[52] U.S. Cl. ...................................... 358/231; 358/56; 358/232; 358/235; 358/61
[58] Field of Search ............... 340/700, 701, 702, 752, 340/783; 358/56, 59, 60, 61, 63, 199, 200, 201, 206, 230, 231, 232, 235, 236, 241

[56] References Cited

U.S. PATENT DOCUMENTS

| | | | |
|---|---|---|---|
| 1,796,030 | 3/1931 | Kell | 358/231 |
| 3,161,726 | 12/1964 | Todt | 358/230 |
| 3,783,185 | 1/1974 | Spaulding | 358/61 |
| 3,843,960 | 10/1974 | Kanazawa | 358/61 |
| 4,009,488 | 2/1977 | Smith | 358/61 |
| 4,163,332 | 8/1979 | Salam | 340/783 |
| 4,390,903 | 6/1983 | Pomeroy | 358/199 |
| 4,525,711 | 6/1985 | Gery | 340/700 |
| 4,620,230 | 10/1986 | Spiger | 358/201 |
| 4,871,231 | 10/1989 | Garcia, Jr. | 358/63 |

Primary Examiner—Howard W. Britton
Assistant Examiner—Mark R. Powell

[57] ABSTRACT

Both a method of producing an image in accordance with an input signal having a location and brightness information and an apparatus for displaying such image are disclosed in the present application. The method comprises activating an energy source which emits photons in accordance with the brightness information of the input signal and processing the emitted photons for selected transmission along a predetermined path and in a manner to form a region of high photon energy at a location on the predetermined path in accordance with location information of the input signal. This method can be enhanced by allowing for production of a colored image when the input signal additionally includes color information. The color is achieved by selectively passing the emitted photons through colored filters in accordance with the color information to thereby impart the color. The apparatus for reproducing an image in accordance with the input signal comprises a plurality of light conduits parallel to the screen which collectively define an area for displaying the image. A light source is provided for the light conduits and the emitted light is processed for selective transmission in the light conduits having a brightness in accordance with the brightness information of the input signal and in a manner to produce regions of concentrated emitted light in the conduits in accordance with the location information.

14 Claims, 1 Drawing Sheet

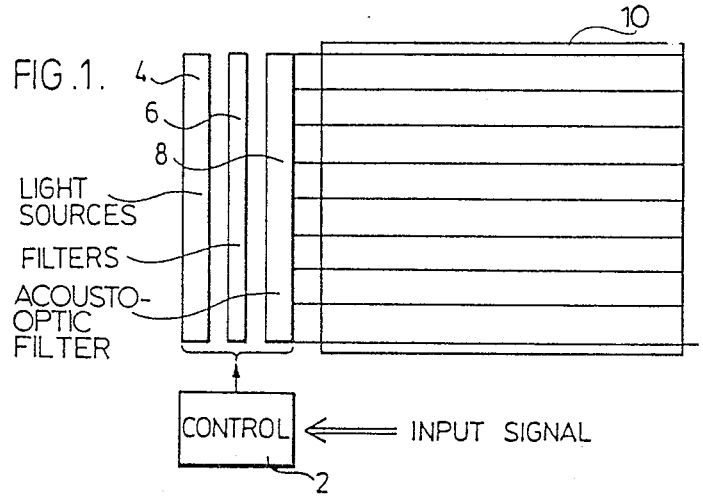
FIG. 1.
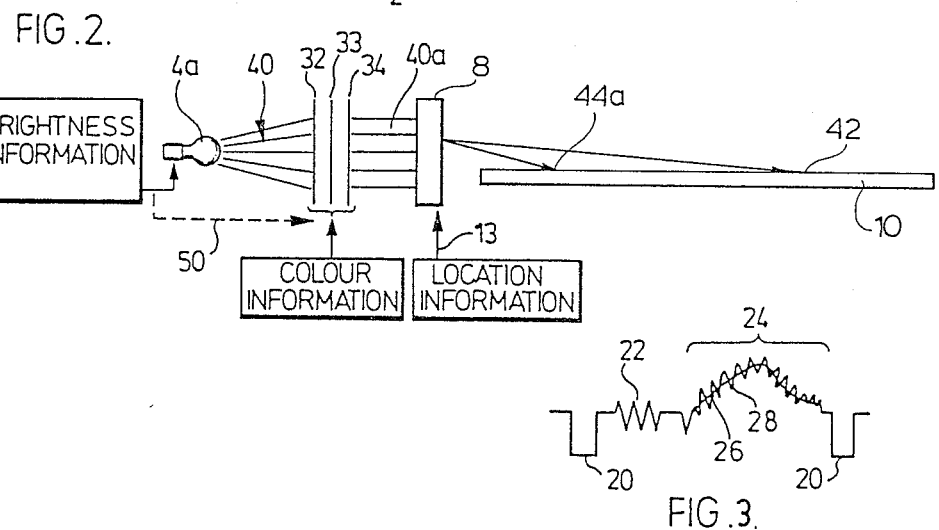
FIG. 2.
FIG. 3.
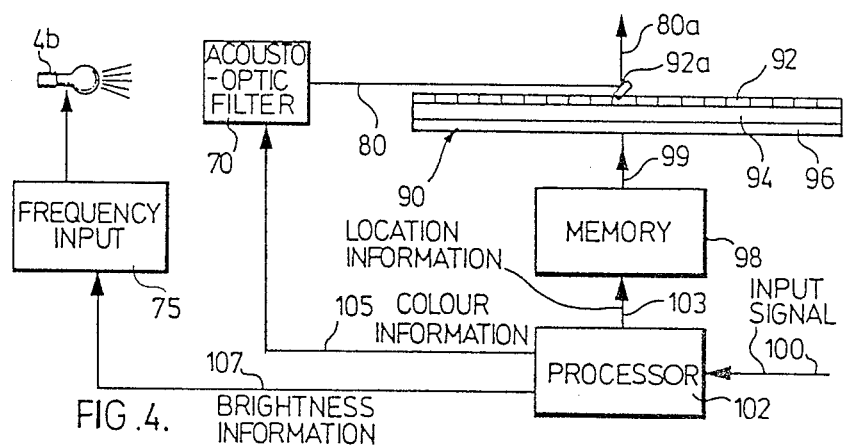
FIG. 4.

METHOD AND APPARATUS FOR DISPLAYING AN IMAGE

This is a continuation-in-part of Application Ser. No. 667,421 filed Nov. 1, 1984 now abandoned.

FIELD OF THE INVENTION

The present invention relates to apparatus and method for reproducing an image in accordance with an input signal having location and brightness information. The present television signals would be included in this definition of an input signal having location and brightness information, however as opposed to a conventional television, the present invention selectively directs a beam of high photon energy at a screen. The beam strikes the screen at a shallow angle causing a point of high visibility on the screen. Preferably the input signal also includes colour information and this colour information is incorporated in the emitted photon beam by selectively passing the photon beam through coloured filters controlled by the colour information of the input signal.

BACKGROUND OF THE INVENTION

A conventional television input signal, once transformed, for use in the television, essentially comprises a series of discrete groups of location, brightness and colour information for producing a dot at a particular location on a television screen of the desired brightness and colour. This information is generally transmitted as lines made up of a plurality of points in a horizontal plane of the television screen. The electron gun of the television activates the individual locations on the screen, as the gun is swept there across to produce the desired image. This technology is well documented and understood and therefore further explanation is not required. This existing technology requires an electron gun behind the screen and thus produces a very deep structure.

SUMMARY OF THE INVENTION

The method for forming a plurality of light spots on a screen surface by selectively creating a sequence of spots of light of varying brightness at particular locations in accordance with an input signal having brightness and location information, according to the present invention, comprises transmitting a beam of light from a position adjacent to the edge of such screen, in a manner generally across the screen such that the transmitted light is at a shallow angle to the screen aimed to contact the screen at a predetermined point and cause the screen at the predetermined point to become illuminated. This occurs as the screen has a surface for causing general illustration thereof at the point contacted by the light beam. The brightness of the beam is controlled in accordance with brightness information of the input signal to achieve the desired level. The level of brightness can be varied, for example, by varying the brightness of the beam or by changing the frequency at which a point is illuminated.

The method of producing an image in accordance with an input signal having location and brightness information according to the present invention, comprises activating energy sources which emit photons in accordance with the brightness information of the input signal and processing the emitted photons for selective transmission along predetermined paths and in a manner to form a region of high photon energy at locations on a screen in accordance with the location information of the input signal. The screen reacts with the high photon energy to become generally illuminated at the points of contact with the emitted photons. Preferably the energy sources emit visible light. The method can further be enhanced if colour information is incorporated in the input signal and the emitted photons are selectively passed through coloured filters to impart the colour information thereto.

The invention also includes apparatus for carrying out the method described above.

BRIEF DESCRIPTION OF THE PREFERRED EMBODIMENTS

Preferred embodiments of the invention are shown in the drawings wherein;

FIG. 1 is a schematic of the apparatus for producing an image in accordance with an input signal having location brightness and colour information;

FIG. 2 is a schematic representation of one individual light conduit and associated lens filter and light source for the conduit;

FIG. 3 is a schematic of a portion of a conventional television signal; and

FIG. 4 shows a modified method which selectively reflects a light beam from its normal path in accordance with the input signal.

DETAILED DESCRIPTION OF THE PREFERRED EMBODIMENTS

As shown in FIG. 1, an input signal such as a television signal having location brightness and colour information is shown being inputted into a control unit 2 used to adjust light sources 4, the filters 6 which preferably include a polarizing filter and the acousto-optic filter 8. Each acousto-optic filter accurately directs the associated light beam at particular angles relative to the screen 10, as best shown in FIG. 2, in accordance with the location information. By varying the angle, a line of the screen can be repeatedly scanned to define an image when combined with the other scanned lines. Thus, signals are produced which are transmitted from one edge of the screen along lines at various angles to the screen which is selectively locally illuminated when contacted by the transmitted light.

In a conventional television signal, a portion of which is generally shown in FIG. 3, a number of synchronization pulses 20 are present which represent the start of a line of information. After each synchronization pulse, is a colour burst 22 followed by the brightness and colour information for each point on the line. This is represented by a portion of the signal shown in brackets as 24. The signal represented by the smooth line of 26 of portion 24, is the brightness or luminance information and the signal of 28 carried on line 26 is the colour information. This is sometimes referred to as chrominance information. This television signal is time based and therefore the location information is a position of the individual point between synchronization pulses. Thus it can be appreciated that the signal generally shown in FIG. 3 includes location, brightness and colour information for activation a spot on a television screen which collectively will define the image represented by the input signal. The signal also includes timing information.

FIG. 2 shows one possible arrangement for each individual light source and the control therefor. In this case each individual light source, generally shown as 4, has associated therewith filter 6, which can include a polarizing filter for polarizing the light emissions, and acousto-optic filter 8 whch serves to control the angle of the transmitted light beam. Each light beam has, in effect, an adjustable lens (acousto-optic filter 8) which can be varied by current indicated by line 13. Thus the location information can be translated to an appropriate current to adjust the acousto-optic filter 8 and thereby change the angle of the transmitted light beam. One such light beam is indicated as position 30 in FIG. 2. A light emitting diode 4a is shown and emits light generally represented by the individual beams or rays 40. This light is then passed through a number of filters generally designated as 32, 33 and 34 which are selectively activated in accordance with the colour information to produce a modified light emission 40a after passing through the filters and this modified light emission is in accordance with the colour information contained in the input signal for a particular location. This light emission 40a is then passed through acousto-optic filter 8 and will provide a region of illumination on screen 10 at point 42. It can be appreciated that if a different current was applied to acousto-optic filter 8, the point of illumination can be varied across the screen 10. One such point of illumination is shown as 44a. The filters 32, 33 and 34 are preferably red, green and blue which can be co-ordinated to effectively provide the desired colour. Furthermore, these filters can be controlled in a manner to achieve the desired brightness as schematically illustrated by dotted line 50. This brightness information can be used to directly control the light emitting diode 4a. It has been found a number of organic crystals can be used as the desired filters and have the required response characteristics necessary for reproducing of the image. It is also possible to use acousto-optic tunable wavelength filters to select appropriate wave lengths of monochromatic light from a white light source. Other techniques such as scanning, diffraction, grating and/or filter wheel might also be used. Acousto-optic devices are commercially available from Inrad, Northvale, N.J.

The particular screen is of the deflection crystal type and when contacted by a light beam, such as a laser light beam, deflects the light at various angles to define an illuminated local area. Such screens are sometimes referred to as Magnification Screens and are available from the Special Design Bureau of the Central Institute of Scientific Information MOSCOW.

A slightly different embodiment is shown in FIG. 4, wherein a light emitting diode 4b is being directly controlled by a frequency input device 75 which controls the actuation of the LED. Therefore, it is possible by changing the frequency input to effectively change the brightness of the spot formed. For example in a conventional television each spot is actuated approximately 30 times per second, however in this case, if a beam is only sent to a particular location ten times per second it would have a different brightness level than if the beam was sent 30 times per second. Therefore, it can be appreciated that by changing the frequency input it is possible to vary the brightness of these spots formed. This light beam is then passed through an acoustic-optic filter, generally designated as 70, to thereby provide a non-monochromatic beam, generally designated as 80. This light beam is generally parallel to the plane of the screen, generally designated as 90, and the outer surface of this screen has been provided with a mirror like surface made up of individual elements 92. Each of these elements is movable as generally indicated by the one element 92a to position to deflect the beam 80 in direction generally perpendicular to the screen. These individual elements are controlled by magnetic actuators, generally indicated as 94, which lie beneath each individual element. These actuators are controlled by underlying circuitry, generally desigated as 96, and this circuitry is directly controlled by the memory 98 through line connection 99. The memory can actuate the individual elements 92 in accordance with the input signal and the particular scheme or sequence of forming the light spots. It can thus be appreciated that this reflection of the light beam, which is initially transmitted in a direction generally parallel to the plane of the screen, can effectively produce the desired sequence of light spots which represent the image.

As can be appreciated in FIG. 4, a beam of light 80 is transmitted from a position adjacent the edge of the screen, generally indicated as 90, across the screen such that the transmitted light is at least initially generally parallel to the screen. A predetermined path is then provided by the initial direction of the light beam in combination with the particular modification of the surface of the screen to thereby form regions of light illumination in accordance with the brightness and location information of the input signal. This is schematically illustrated in FIG. 4 where the input signal 100 is processed by a processor 102 to brake the input signal into location information transmitted on line 103 to the memory 98, colour information transmitted along line 105 to the acoustic-optic filter 70 and brightness information transmitted on line 107 to the frequency input device 75. The location information transmitted along 103 to the memory 98 would be used to synchronize the movement of individual elements 92 in accordance with the location information of the input signal.

With this invention, it is certainly possible to utilize existing television input signals and in this case the apparatus would include straight light conduits which extend across the screen. However, it can be appreciated that this only one possible configuration to produce individual controlled light beams and although preferred, due to its compatability with exiting signals, it is not restricted to this embodiment. It can further be appreciated that if one does not wish to produce a coloured image, the filters means generally designated as 6 could be omitted and the brightness information used to directly control the light source.

The preferred embodiment has been described with respect to a light source, however, it is not deemed restricted to merely visible light. It is also within the scope of the present invention to use a photon source and this may require the use of a special screen or other means to make the region of concentrated photon energy visible to one side of the screen. Possibly the other side of the screen could be treated to react in accordance with this photon energy, as but one possibility. It is also possible for lasers to be used for the light source.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A method of producing an image in accordance with an input signal having location and brightness information in a timed sequence comprising, activating an energy source which emits photons in accordance with the brightness information of the input signal; and processing the emitted photons for selective transmission along a predetermined path at a shallow angle to a deflection crystal type screen to strike the screen at a position determined in accordance with the location information of the input signal to produce a visible area of photon energy on the screen.

2. A method as claimed in claim 1 wherein the energy source emits white light.

3. A method as claimed in claim 1 wherein processing of the emitted photons includes passing the emitted photons through coloured filters.

4. A method for producing an image formed of a plurality of light spots on a screen by selectively creating spots of light of varying brightness at particular locations on a screen in accordance with an input signal having brightness and location information comprises:

directing and transmitting beams of light from a position adjacent to the edge of the screen, in a manner generally across the screen at a shallow angle such that the transmitted light is at least initially substantially parallel to the screen, providing predetermined paths for transmitted beams of light to contact the screen and form regions of light illumination on the screen at particular locations in accordance with the location information of the input signal, and varying the transmitted beams of light in accordance with the brightness information of the input signal to achieve the appropriate brightness at the particular locations.

5. A method as claimed in claim 4 wherein varying the transmitted beam of light varying the frequency of transmission of the light beam to a particular location in accordance with the brightness information of the input signal to thereby vary the brightness of formed regions of light illumination.

6. A method as claimed in claim 4, wherein the transmitted light is filtered to be of a particular colour prior to transmission.

7. A method as claimed in claim 4, wherein varying the transmitted beam of light includes varying the frequency of transmission of the light beam to a particular location in accordance with the brightness information of the input signal to thereby achieve a desired brightness level of the formed regions and including selectively passing the transmitted light through acousta-optic tunable filter means to selectively provide a colour to the formed regions and controlling the filter means in accordance with colour information included in the input signal.

8. A method of producing an image in accordance with an input signal having brightness, location and colour information of a plurality of spots in a timed sequence which collectively represents the image, said method comprising, producing light emissions;

filtering the light emissions in accordance with the colour information to produce coloured light emissions; and processing the coloured light emissions to produce regions of concentrated coloured light emissions on predetermined paths which are aimed to contact a screen at a shallow angle in accordance with the location information;

wherein the regions of concentrated coloured light emissions form illuminated regions on the screen where the predetermined paths contact the screen, thereby producing a plurality of light spots which collectively represent the image.

9. A method of producing an image as claimed in claim 8 wherein filtering of said produced light emissions includes selectively passing the emissions through coloured light filters.

10. A method as claimed in claim 9 wherein the filtering of said produced light emissions is controlled to additionally produce coloured light emissions having brightnesses in accordance with the brightness information of the input signal.

11. Apparatus for reproducing an image in accordance with an input signal having brightness, location and colour information for producing light spots at discrete screen locations and time to collectively reproduce such image on a screen, comprising a screen which has a surface which illuminates in the contacted area when contacted with a light beam, light source means associated with said screen at an edge thereof for producing light beams, filter means for colouring the light beams in accordance with the colour information, and acousto-optic filter means for directing said coloured light beams at discrete locations on said screen in accordance with the location information and means for adjusting the brightness of the light beams in accordance with the brightness information whereby the image is produced on said screen and, visible to one side of said screen.

12. Apparatus as claimed in claim 11 wherein said light source means includes a laser.

13. A method as claimed in claim 8 including the step of polarizing the produced light emission.

14. A method as claimed in claim 8 wherein the step of processing the coloured light emissions includes processing the coloured light emissions by means of acousto-optic filters.

* * * * *